US007155790B2

(12) United States Patent
Palejwala et al.

(10) Patent No.: US 7,155,790 B2
(45) Date of Patent: Jan. 2, 2007

(54) AXIAL SWAGE TOOL

(75) Inventors: Kirit M. Palejwala, Rowland Heights, CA (US); Gilad S. Sassoon, Sherman Oaks, CA (US)

(73) Assignee: Designed Metal Connections, Gardena, CA (US)

( * ) Notice: Subject to any disclaimer, the term of this patent is extended or adjusted under 35 U.S.C. 154(b) by 255 days.

(21) Appl. No.: 10/828,636

(22) Filed: Apr. 21, 2004

(65) Prior Publication Data

US 2005/0081359 A1 Apr. 21, 2005

Related U.S. Application Data

(60) Provisional application No. 60/512,646, filed on Oct. 20, 2003.

(51) Int. Cl.
*B23P 19/04* (2006.01)
*B23P 11/00* (2006.01)

(52) U.S. Cl. .......................................... 29/237; 29/252

(58) Field of Classification Search .................. 29/237, 29/252, 282, 520, 183.5; 72/453.02
See application file for complete search history.

(56) References Cited

U.S. PATENT DOCUMENTS 4,189,817 A * 2/1980 Moebius ...................... 29/237
4,345,361 A * 8/1982 Baumann ..................... 29/237
4,418,458 A * 12/1983 Hunter ........................ 29/237
5,297,325 A * 3/1994 Thelen ........................ 29/237
5,305,510 A * 4/1994 Croft et al. ................... 29/237
5,398,394 A * 3/1995 Hyatt et al. ................... 29/237
5,483,731 A * 1/1996 Prendel et al. ................ 29/237
5,592,726 A * 1/1997 Suresh ........................ 29/237
5,654,527 A 8/1997 Ciobanu et al.
5,680,687 A * 10/1997 Hyatt et al. ................... 29/237
5,694,670 A * 12/1997 Hosseinian et al. ........... 29/237
5,743,131 A * 4/1998 Holliday et al. ........... 72/409.1
6,430,792 B1 * 8/2002 Foster et al. .................. 29/237
6,434,808 B1 * 8/2002 McKay ........................ 29/237
6,823,573 B1 * 11/2004 Morrison et al. ............. 29/237
2005/0081359 A1 * 4/2005 Palejwala et al. ............. 29/516

* cited by examiner

*Primary Examiner*—Lee D. Wilson
(74) *Attorney, Agent, or Firm*—Law Office of John A. Griecci

(57) ABSTRACT

An axial swaging tool including a housing defining a chamber, a piston rod held statically in the chamber, a piston conformingly receiving and slidable along the piston rod, a ram conformingly receiving and slidable on a first end of the piston rod, a first engagement member statically positioned on the housing, a second engagement member positioned on the piston, and a spring adjoining the piston and an end of the piston rod. The spring is configured to bias the piston away from a second end of the piston rod, such that the second engagement member is biased away from the first engagement member, the piston rod is biased against a first end of the housing, and piston is biased against the ram, which in turn is biased against a second end of the housing. The ram is made of a bearing material, and carries a seal such that it forms a hydraulically sealed chamber within the chamber at the second end of the housing, the hydraulically sealed chamber to be used with a source of pressurized hydraulic fluid for hydraulically driving the ram and piston toward the first end of the housing, compressing the spring and forcing the second engagement member toward the first engagement member.

15 Claims, 4 Drawing Sheets

AXIAL SWAGE TOOL

The present application claims the benefit of U.S. provisional application Ser. No. 60/512,646, filed Oct. 20, 2003, which is incorporated herein by reference for all purposes.

BACKGROUND OF THE INVENTION

The present invention relates to tools for use in swaging and, more particularly, to a swaging tool for swaging axially swaged fittings.

Swaged fittings have been used for many years to connect tubes and pipes in various types of systems, including fluid systems used in the aircraft, marine, petroleum and chemical industries, as well as power transmission systems and the like. In a typical fluid system, the ends of two tubes are inserted into opposing ends of a fitting, each of which is usually in the form of a cylindrical sleeve. The fitting is then swaged with a swaging tool to produce a fluid-tight connection placing the tubes in fluid communication. This swaging operation is normally carried out by applying a radial force that radially compresses the fitting and tubing inwardly. This radial force may be applied directly by the swaging tool or indirectly by a specially shaped ring that is moved axially by the swaging tool to apply a radial force to the fitting. The invention of the present application is directed to the latter type of swaging tool designed for use with fittings having axially movable swaging rings. These fittings are referred to as axially swaged fittings.

Typical axially swaged fittings comprise a cylindrical sleeve having openings at opposite ends for receiving the ends of two tubes, with a swaging ring at each end of the sleeve. The outer surface of the sleeve and the inner surface of the swaging ring contact each other, being shaped such that axial movement of the swaging ring over the sleeve applies a radial force to the sleeve and, thus, to the tubes. Although not all fittings employ a sleeve with two swaging rings, the use of two swaging rings is preferable when it is desired, as is often the case, to join two tubes to each other.

An example of a prior art swaging tool can be seen in U.S. Pat. No. 5,592,726, which is incorporated herein by reference for all purposes. With reference to FIG. 1, which represents the tool depicted in FIG. 5 of the patent, the prior art swage tool includes a housing 11 with a cylindrical bore forming a chamber, and a piston 13, each having a jaw unit used for the axial swaging of a fitting. The piston 13 is held and carried on a stabilizing pin 15 that is conformingly received by a ram 17. The stabilizing pin and ram are held together by a spring 19. The spring, which reacts against a plug 21 that is held in place within the housing by a retainer ring 23, pushes the stabilizing pin and ram toward an end of the housing opposite the plug.

A tube 25 is inserted into a sleeve 27 with a swaging ring 29, with the sleeve being held by an outer yoke 31 on the housing and the swaging ring being adjoined by an inner yoke 33 on the piston 13. When hydraulic fluid (e.g., oil) is introduced into the housing via a port 35, the ram 17, the stabilizing pin 15 and the piston 13 translate axially through the housing together to compress the spring, causing the inner yoke to drive the swaging ring toward the outer yoke (as depicted), thereby axially swaging the sleeve onto the tube.

The ram and stabilizing pin each include a bearing 37 and 39 (respectively) to provide for smooth translation within the housing. When the stabilizing pin 15, piston 13 and ram 17 are translated by the spring into the portion of the housing near the plug, the stabilizing pin bearing 39 moves into a portion of the housing cylinder that forms a cutout within which the yoke 33 of the piston moves. To provide radial support for the stabilizing pin bearing around most of its circumference, the cutout defines lobes on either side of a narrow slot. The ram further includes a seal 41 and a seal ring 43 to prevent hydraulic fluid from seeping past the ram.

While the above-described tool has a good functional design, there are some features that would preferably be improved. For example, in assembling such a tool, each part contributes to tolerance buildup, and each area of contact between relatively moving parts is subject to wear. Furthermore, the stabilizing pin bearing is subject to wear when it is supported from less than a full 360 degrees, such as when the bearing moves within the portion of the housing forming the narrow slot.

Accordingly, there has existed a need for a swaging tool, for swaging axially swaged fittings, that has few moving parts, is lighter in weight and/or more reliable than most prior swaging tools. In various embodiments, the present invention satisfies some or all of these and other needs and provides further related advantages.

SUMMARY OF THE INVENTION

The present invention is embodied in an axial swaging tool having a drop-in piston, i.e., a movable jaw unit, and a stationary piston rod that effectively react moments on the piston during a swaging operation. The design of the tool, with the features described below, contributes to a balanced swaging tool that is typically compact, lightweight, and simple. Furthermore, the swaging tool of the present invention is typically robust, simple to operate, reliable in use, and relatively low in maintenance.

Typical embodiments of the swaging tool include a housing configured for a first swaging engagement member (e.g., a jaw unit having a yoke), and a piston rod configured to remain stationary with respect to the housing. A piston is configured to translate along the piston rod, the piston being configured for a second swaging engagement member. An actuator is configured to drive the piston along the piston rod such that the second engagement member moves toward the first engagement member.

This combination of features is typically characterized by substantially fewer parts than many prior art tools, and more particularly, is typically characterized by fewer moving parts. Furthermore, the smaller number and simple arrangement of the parts limit the tolerance build-up, which can otherwise result in the piston engagement member rotating to a less-than-preferred angle with respect to the housing engagement member, and which might require custom machining during manufacture to achieve acceptable tolerances. Furthermore, the design limits bearing loads from being distributed in an uneven fashion that causes excessive wear.

Preferably, the housing provided in embodiments of the invention features an axial chamber, and the piston rod extends axially within that chamber. The piston includes an inner guide surface that conformingly receives the piston rod such that the piston can translate in opposite axial directions along the piston rod. A ram, having a ram inner guide surface conformingly receiving the piston rod, can translate in opposite axial directions along the piston rod while adjoining the piston. These features typically provide for the piston rod to react significant bending moments placed on the piston during swaging.

Many embodiments of the invention also feature a spring compressed between a stop on the piston rod and the piston.

The piston is compressively held between the spring and the ram, and a piston rod end is compressively biased to be stationary, with respect to the housing, by the spring. The spring becomes further compressed by the ram when driving the piston axially along the piston rod. The spring provides for the tool to be self-resetting, and provides for the piston rod to be lodged firmly and statically in the chamber without permanently anchoring it or using an attachment that could more easily jam or bind.

Other features and advantages of aspects of the present invention will become apparent from the following description of the preferred embodiments, taken in conjunction with the accompanying drawings, which illustrate, by way of example, the principles of the invention.

DETAILED DESCRIPTION OF THE PREFERRED EMBODIMENT

The invention summarized in the embodiments below and defined by the enumerated claims may be better understood by referring to the following detailed description, which should be read with the accompanying drawings. This detailed description discloses particular preferred embodiments of the invention, set out below to enable one to build and use particular implementations of the invention, and it is not intended to limit the enumerated claims, but rather, it is intended to provide particular examples of them.

Typical embodiments of the present invention reside in an axial swaging tool configured to axially swage a fitting to a tube, a cable, or other such item of manufacture. To do so, the swaging tool is typically configured to receive yokes for grasping and driving a swaging ring over the fitting, the swaging ring thereby radially compressing the fitting around the item. The basic grasping and driving mechanics of yokes on rings and fittings to make axially swaged fittings, including the use of varied yokes for different fittings, are known in the art, need not be further reviewed herein.

Figure 1:
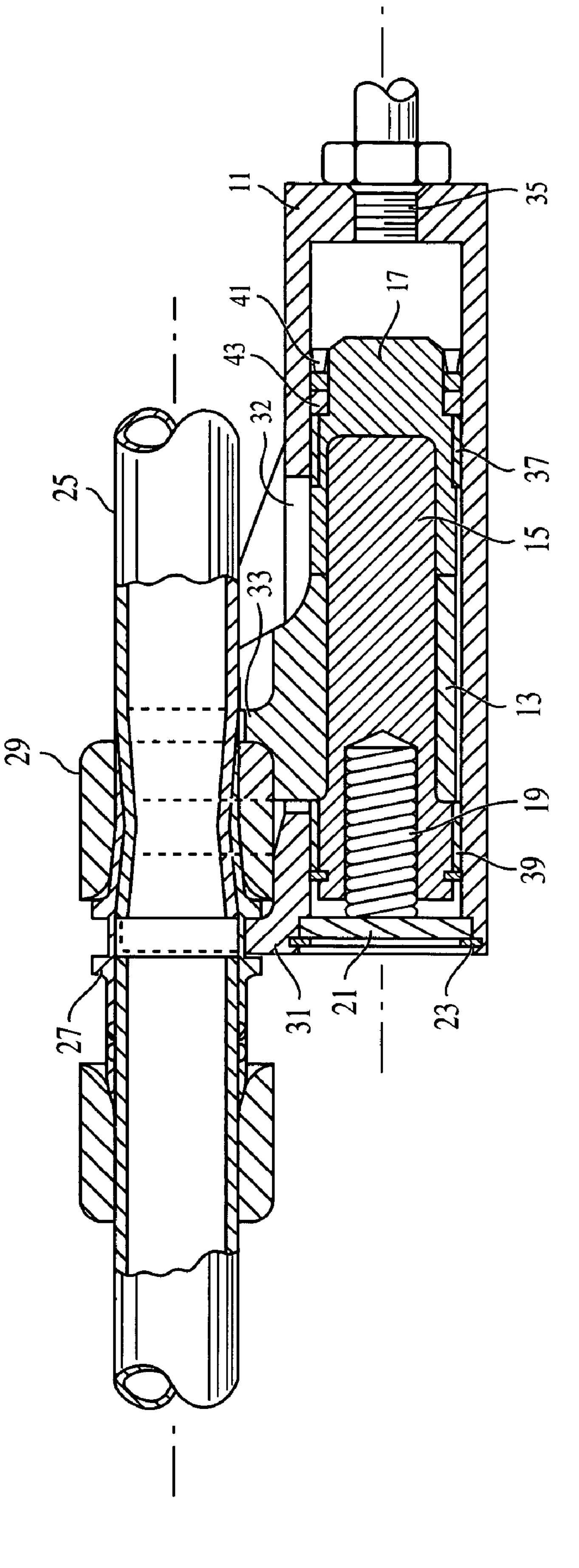
FIG. 1 PRIOR ART
FIG. 1 is a cross-sectional, elevational view of a prior art axial swaging tool, in an actuated position after having been used to swage a fitting.
Figure 2:
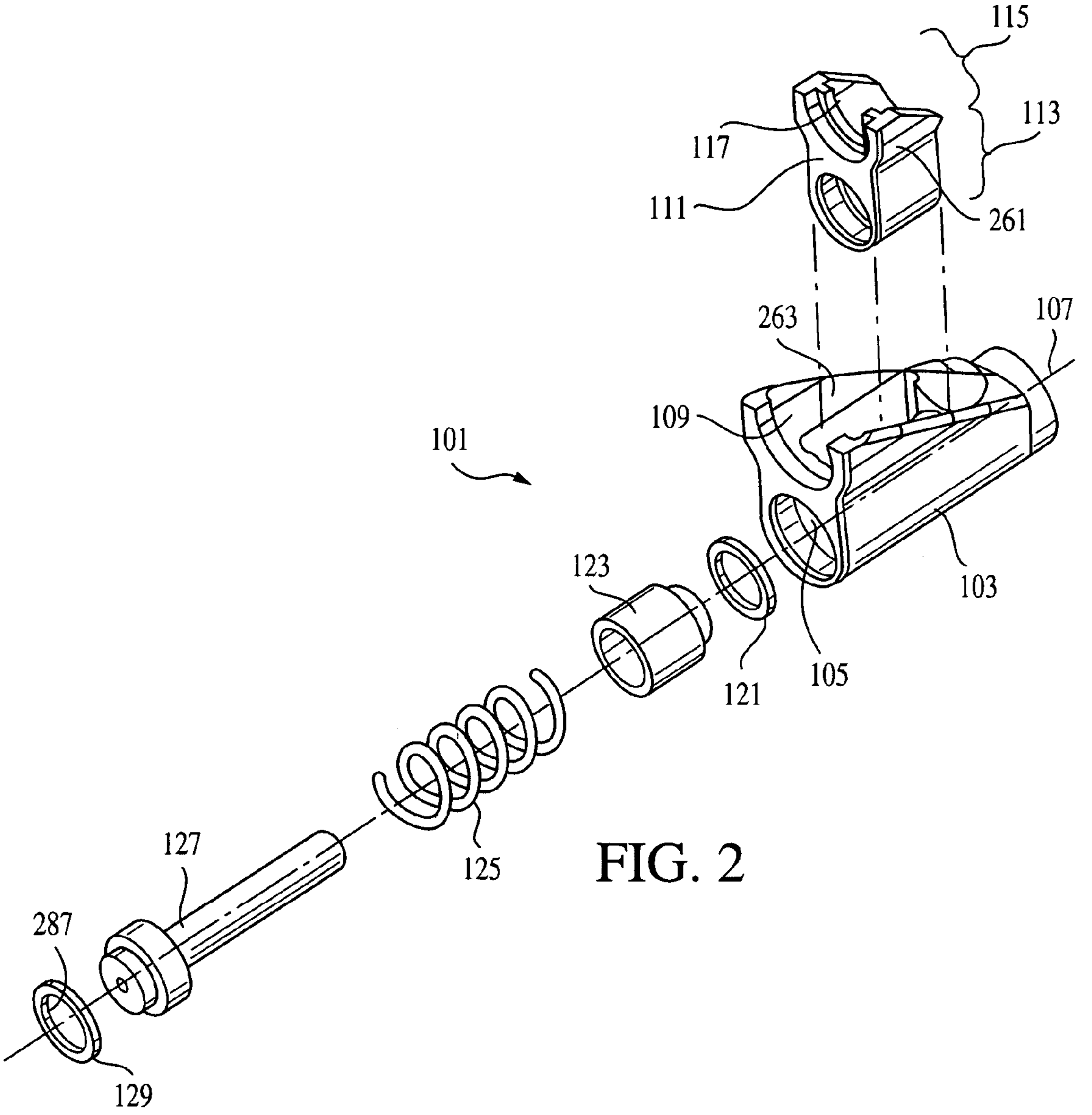
FIG. 2 is an exploded, perspective view of an axial swaging tool under the present invention.

Embodiments of the present invention are preferably designed to be effective swage tools of simple design. With reference to FIG. 2, a first embodiment of an axial swaging tool 101 under the present invention includes a generally tubular housing 103 having an inner surface 105 that forms a substantially cylindrical chamber defining a chamber axis 107. The housing also forms a jaw unit 109. The embodiment also includes a piston 111 having a first portion 113 configured to move axially within the housing chamber (i.e., configured to slide along the chamber axis), and having a second portion 115 forming a jaw unit 117. The jaw units 109 and 117, of the housing and the piston are configured with yokes that axially swage a fitting when the first portion of the piston slides within the chamber such that the piston jaw unit moves toward the housing jaw unit. To actuate and guide the piston axially along the chamber axis, the housing chamber contains a seal 121, a ram 123, a spring 125, a piston rod 127, and a retaining ring 129.

With reference to FIGS. 3–6D, the housing 103 has a substantially cylindrical outer surface 201, and the inner surface 105 that forms the chamber is also substantially cylindrical. A first end 203 of the housing defines a chamber opening that preferably is (or is approximately) the diameter of the cylindrical inner surface. Optionally, the chamber opening is formed with a counterbore that defines the inner surface 105 to include an end portion 205 having a larger, substantially cylindrical, diameter, and a small axial ledge 207 connecting the end portion 205 to an inner portion 209 of the inner surface 105. A second end 211 of the housing is closed except for a port 213 configured for attaching a source of hydraulic fluid, such as a tube 215 having a screw-on housing connection 217 on one end and a quick-release hydraulic connection 219 on the other end. The first end of the housing includes the housing jaw unit 109, which includes structural reinforcement flanges 221, and a yoke 223.

Figure 5:
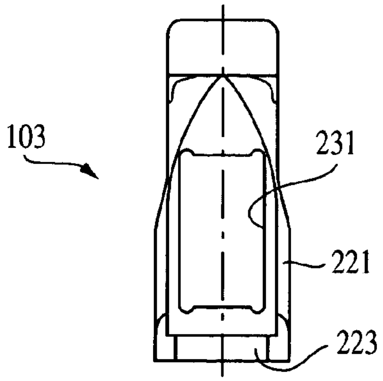
FIG. 5 is a top view of a housing as provided in the axial swaging tool of FIG. 2.

The housing 103 has an approximately rectangular cutout 231 (as seen in FIG. 5) in an axial mid-portion of the housing that permits radial access to the internal chamber. The piston first portion 113 has a cylindrical outer surface 241, and a concentric cylindrical inner guide surface 243 forming a through-hole, the outer and inner guide surfaces defining a piston axis 245 that remains substantially aligned with the chamber axis 107 as the piston moves in opposite axial directions within the housing.

The piston second portion 115 forms the piston jaw unit 117, and includes structural reinforcement flanges 247 and a yoke 249. The housing jaw unit defines a housing jaw axis 251 and the piston jaw unit defines a piston jaw axis 253, and these axes are aligned to form a swage axis 255 when the piston axis 245 is aligned with the chamber axis 107. The two jaw units provided on the housing 103 and the piston 111 are configured for biasing and thereby moving a swaging ring over a fitting sleeve, along the swage axis, to swage the fitting to a tube. The piston second portion 115 includes an approximately cylindrical outer, guide surface 261 that is conformingly received against an approximately cylindrical guide surface 263 on the housing (see, FIG. 2). The jaw units are substantially U-shaped, with yoke surfaces facing in the longitudinal (i.e., axial) direction to provide support surfaces to drive the swaging ring and sleeve toward each other in the swaging process.

The piston 111 is restrained to moving along the chamber axis 107 by the piston rod 127. More particularly, the piston rod includes two axial portions, a cylindrical shaft 271 and a cap 273. The piston rod cap conforms to, and is fixed within the housing chamber opening at the first end of the housing 103. A first axial face 275 of the piston rod cap is at a first end 277 of the piston rod shaft 271, with the shaft extending toward the second end 211 of the housing 103, to a second end 279 of the shaft. The piston rod shaft has an outer diameter conforming to the diameter of the piston inner guide surface 243, and the piston is conformingly and slidably received on the shaft.

The piston rod 127 is held within the housing by the retaining ring 129, which is seated in an annular slot 281 formed on the end portion 205 of the housing inner surface 105. A protrusion 283 on a second, opposite axial face 285 of the piston rod cap 273 is received through a center hole 287 (see, FIG. 2) of the retaining ring 129, preferably reinforcing the seating of the retaining ring in the annular slot. The spring 125 is received on the piston rod shaft, and is continually compressed between the piston rod cap, and the piston 111, adjoining each (i.e., each acts as a stop for the spring). More particularly, the piston rod cap includes an annular slot 291 in its first axial face 275, the annular slot being configured for receiving an end of the spring.

Likewise, a first axial end 293 of the piston 111 has a counterbore surface 295 displacing what would otherwise be part of the inner guide surface 243, and forming an axial annular face 297 that connects the counterbore surface to the inner guide surface. The piston rod cap annular slot 291 and the piston counterbore surface 295 approximately conform to, and receive, opposite ends of the spring 125. In receiving the spring, they provide additional support to center it on the shaft and restrain the ends of the spring. The piston rod 127 is thus held stationary by its cap, the cap being compressed against the retaining ring 129 by the spring. Optionally, the axial ledge 207 formed in the housing opening can be configured either hold the piston rod stationary or to limit the travel of the piston rod into the chamber during assembly of the tool.

Located in the second end 211 of the housing, the ram 123 is a cylindrical, cup-shaped device having an outer surface 301 configured to conformingly slide axially along the housing inner surface 105 within the housing chamber. The ram has a first, closed end forming a head 303 that faces the second end of the housing. When pressurized hydraulic fluid is introduced through the port 213, it acts against the head of the ram, urging the ram toward the first end 203 of the housing. The ram also has an axial cylindrical bore in a second end 305 opposite its closed end, with a cylindrical interior guide surface 307 defining the bore.

The ram interior guide surface 307 is conformingly received over the second end 279 of the piston rod shaft 271 such that the ram second end adjoins the piston 111 on a second axial end 311 of the first portion 113 of the piston, the second axial end being opposite the first axial end 293 of the piston. The ram 123 is thus configured such that it can translate axially through the chamber at the second end of the housing 103, toward the first end 203 of the housing, driving the piston and one end of the spring 125 as it moves. This translation toward the first end of the housing is ultimately limited either by the depth of the bore within the ram, or by the piston's axial freedom of movement (such as from the fully compressed spring length, the cutout length, or limitations on the movement of the piston jaw unit).

Figure 3:
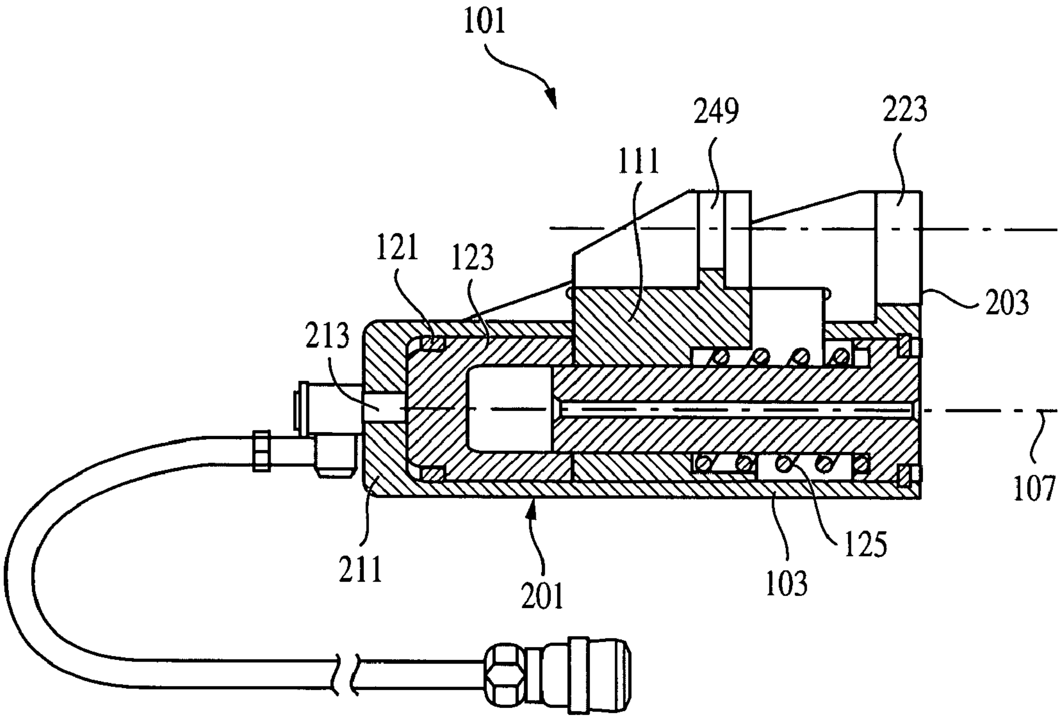
FIG. 3 is a cross-sectional, left side view of the axial swaging tool, taken along line 3—3 of FIG. 2, depicting the swaging tool in a relaxed configuration.

With the tool in a relaxed, (i.e., not actuated) configuration (as depicted in FIG. 3), the spring 125 is in a relatively expanded position, pushing the piston 111 toward the second end 211 of the housing 103 against the ram 123. The ram in turn pushes against the second end of the housing, but is still long enough to retain the second end 279 of the piston rod 127 within its bore. The spring's compressive force is reacted against the piston rod cap 273, which is fixedly retained against the retaining ring 129. Non-axial rotation of the piston rod is restrained in part by radial support forces given to the piston rod shaft by the inner guide surface 307 of the ram. To restrict rotation, these forces are balanced against radial support given to the piston rod cap by the inner surface 105 of the housing 103.

The ram 123, which carries the seal 121 on a protrusion 321 that is part of its head 303, is made of a durable bearing material (e.g., aluminum bronze) such that no additional bearing is needed for the ram to freely translate along the inner surface 105 within the housing 103, and over the piston rod 127. Circumferential grooves can be used on the ram's surfaces that act as a bearing. When hydraulic fluid is pumped into the housing chamber via the port 213 on the second end 211 of the housing 103, the hydraulic fluid is prevented from flowing between the ram outer surface and the housing inner surface 105 by the seal. Thus, the ram, aided by the seal and the second end of the housing, forms a hydraulic chamber and acts as an actuator for the tool.

Pumping pressurized hydraulic fluid into the hydraulic chamber from a pressurized fluid source (e.g., a source of oil at 10,000 psi) applies axially force to the ram 123, pushing it toward the first end 203 of the housing 103. The ram applies the hydraulic axial force to the piston 111, which in turn applies it to the spring 125. The hydraulic force overcomes the axial spring compression force, and the ram, seal and piston translate axially through the housing chamber toward the first end of the housing, compressing the spring. Air that is within the inner guide surface 307 of the ram while the tool is in the relaxed state, is vented from the tool during actuation via a ventilation hole 323 that extends axially through the center of the piston rod 127.

Figure 4:
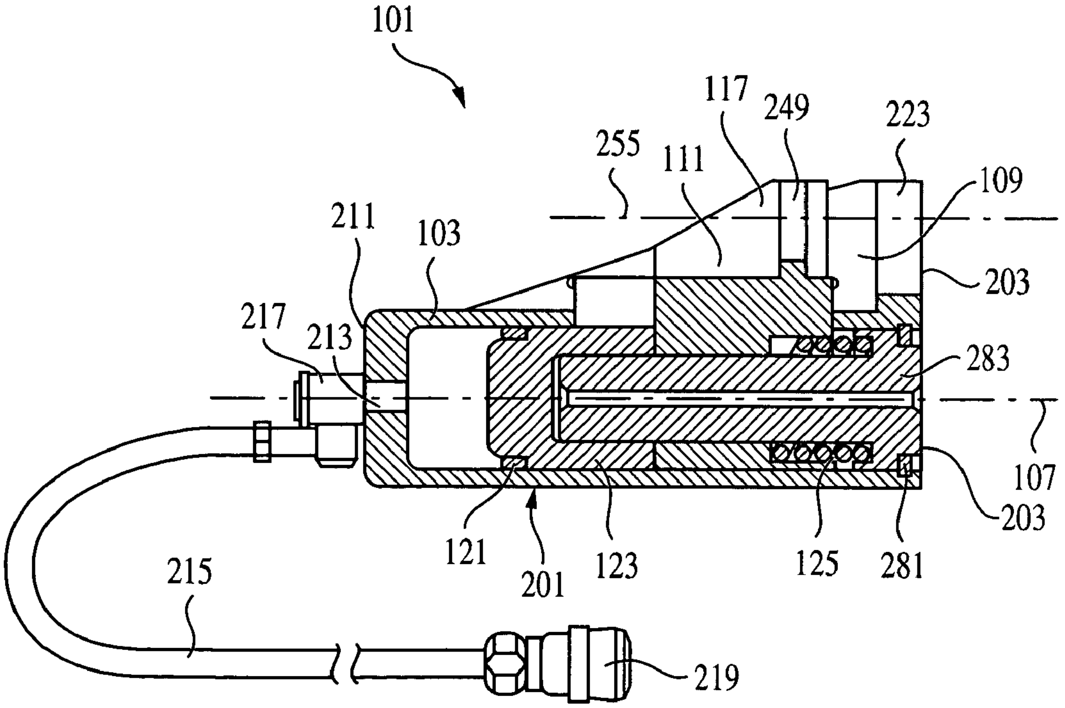
FIG. 4 is a cross-sectional, left side view, similar to FIG. 3, depicting the swaging tool in an actuated configuration.
Figure 6A:
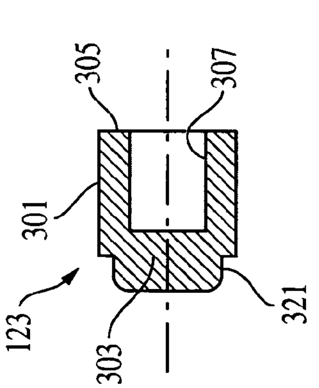
FIG. 6A is a cross-sectional, left side view of a ram, as found in the axial swaging tool depicted in FIG. 3.
Figure 6B:
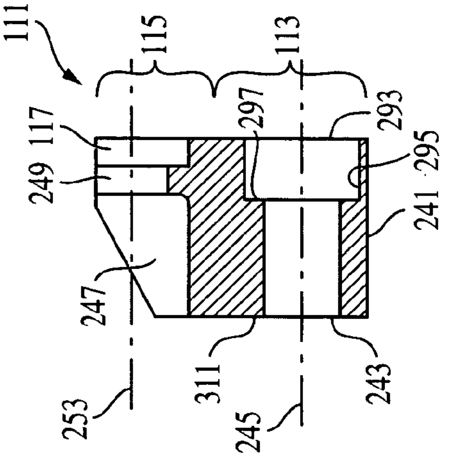
FIG. 6B is a cross-sectional, left side view of a piston, as found in the axial swaging tool depicted in FIG. 3.
Figure 6C:
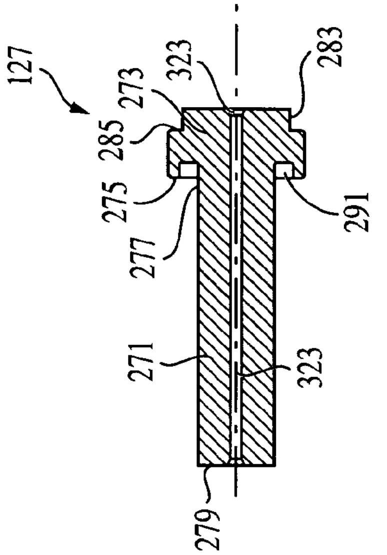
FIG. 6C is a cross-sectional, left side view of a piston rod, as found in the axial swaging tool depicted in FIG. 3.
Figure 6D:
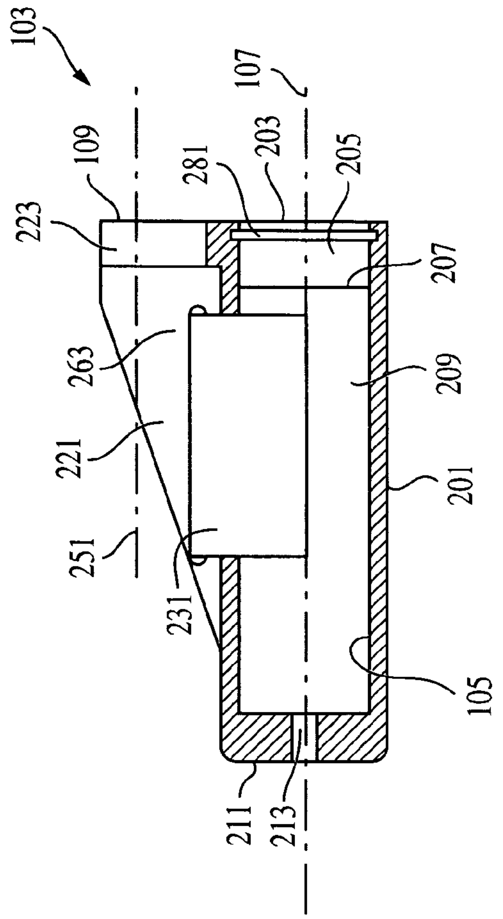
FIG. 6D is a cross-sectional, left side view of a housing, as found in the axial swaging tool depicted in FIG. 3.

The piston 111, translating toward the first end 203 of the housing 103, moves its jaw unit 117 toward the housing jaw unit 109. If a fitting and swaging ring are positioned in yokes of the jaw units during this translation, the swaging ring is driven over the fitting, thus forming a swaged fitting by the time the tool has reached a fully actuated configuration (as depicted in FIG. 4). Preferably, the cutout 231 is only as wide as is necessary to receive the piston, and only as long as is necessary to permit a complete swaging operation, i.e., the cutout is long enough to permit the piston to travel from its relaxed-tool position to a fully actuated position that completes a full swaging operation.

Because the swage axis 255 is not aligned with the chamber axis 107, it will be appreciated that swaging forces apply a moment to the piston 111. These forces can be reacted by the piston second portion cylindrical outer guide surface 261 (against the conforming housing cylindrical guide surface 263) and by the piston inner guide surface 243 against the piston rod 127. The piston rod in turn reacts the forces radially against the housing 103 and the ram 123, and the radial forces on the ram are in turn reacted by the housing. Thus, all forces are reacted by the housing.

When the hydraulic pressure is removed from the hydraulic chamber, the compressed spring 125 expands, applying spring forces to the piston 111. The piston transmits these forces to the ram 123, which forces the hydraulic fluid from the hydraulic chamber and back down the tube. Air is allowed to return to the bore within the ram via the ventilation hole 323.

In summary, in the present embodiment, the piston rod 127 is held substantially fixed and stationary within the housing 103 by the retaining ring 129 and the spring 125, the spring extending between the piston rod cap 273 and the piston 111. The ram 123 and the piston are configured to both conformingly receive, and translate axially along, the piston rod when hydraulic fluid is pumped into the housing chamber via the port 213 on the second end 211 of the housing. The ram, which carries the seal 121, is made of a bearing material such that no additional bearing is needed for it to freely translate within the housing and over the piston rod. The seal provides for the housing to form a sealed hydraulic chamber in the axial end of the housing opposite the retaining ring. The ram, the sealed hydraulic chamber, and the source of pressurized hydraulic fluid are thus configured to actuate the piston along the piston rod.

To assemble the axial swaging tool, the seal 121, and the ram 123 are inserted into the chamber, with the ram closed end (head) 303 facing the second end 211 of the housing 103, and the seal mounted on the ram head protrusion. The seal and/or the ram can be inserted either through the housing first end 203, or if they fit, through the cutout 231. The piston 111 is then dropped into the housing through the cutout. The spring 125 and the piston rod 127 are then inserted through the housing first end, with the piston rod shaft 271 facing in to the chamber, either in that order, or with the spring already received on the piston rod shaft. More particularly, the piston rod is inserted and held entirely within the chamber such that the piston rod shaft extends through the spring and piston, and into the bore of the ram, compressing the spring. The retaining ring 287 is then snapped into the annular slot 281 in the inner surface 105 of the chamber. The piston rod is then released, allowing it to press out of the chamber against the retaining ring under the force of the compressed spring, which biases the piston and the ram away from the first end of the housing.

With specific reference to FIGS. 3 and 4, an operator can swage one side of a fitting by, for example, engaging a groove on a fitting sleeve with the housing yoke 223, which is stationary, to restrain the sleeve from movement during swaging. The piston yoke 249 is then positioned in engagement with an outer end of a swaging ring. When hydraulic pressure is supplied through the port 213, the ram 123, seal 121 and piston 111 are moved toward the first end 203 of the housing 103, compressing the spring 125 and moving the swaging ring over the sleeve, thereby swaging the sleeve to the tube. At the end of the swaging operation, the pressure source is relieved and the spring force returns the piston and the ram toward the second end 211 of the housing, thereby separating the piston jaw unit from the housing jaw unit. This returns the tool 101 to the relaxed position for the next swaging operation.

The fitting sleeve can be adapted for engaging either of the engagement members, so long as the ring is adapted for a distinct selection of the other engagement member. Preferably, both engagement members can receive both the fitting and ring.

This embodiment of the present invention is characterized by substantially fewer parts than the previously described tool, and more particularly, fewer moving parts. The smaller number of parts likely reduces tolerance build-up, which can otherwise result in the piston-yoke rotating to a less-than-preferred angle with respect to the housing-yoke. Furthermore, because the prior art bearing on the stabilizing pin had to pass into portions of the housing having lobes that provide uneven support (i.e., support around less than the full circumference), that bearing was subject to wear at a rate greater than other parts. The elimination of the stabilizing pin provides the ram-bearing with 360 degree support, and thus tends to provide for a tool with preferable overall durability.

From the foregoing, it will be appreciated that the swaging tool of the present invention preferably provides a swaging tool of greatly reduced size, weight and complexity, which typically results in a more reliable and less expensive swaging tool. The tool has few maintenance requirements. These and other advantages give the swaging tool of the present invention unique advantages.

While a particular form of the invention has been illustrated and described, it will be apparent that various modifications can be made without departing from the spirit and scope of the invention. Accordingly, it is not intended that the invention is limited, except as by the appended claims.

We claim:

1. A swaging tool, comprising:

a housing configured for a first swaging engagement member;

a piston rod configured to remain stationary with respect to the housing;

a piston having a piston inner guide surface conformingly receiving the piston rod, the piston being configured to translate along the piston rod, and the piston being further configured for a second swaging engagement member; and an actuator configured to drive the piston along the piston rod such that the second engagement member moves toward the first engagement member.

2. The swaging tool of claim 1, wherein:

the housing defines an axial chamber;

the piston rod extends axially within the housing chamber; and the piston being further configured to translate in opposite axial directions, with respect to the housing, along the piston rod.

3. The swaging tool of claim 2, and further comprising a ram having a ram inner guide surface conformingly receiving the piston rod such that the ram can translate in opposite axial directions within the chamber, with respect to the housing, along the piston rod while adjoining the piston.

4. The swaging tool of claim 2, and further comprising:

a ram having a ram inner guide surface conformingly receiving the piston rod such that the ram can translate in opposite axial directions, with respect to the housing, along the piston rod while adjoining the piston;

wherein the housing defines a hydraulic port configured for injecting hydraulic fluid into the chamber adjacent the ram; and wherein the housing is configured such that the injection of hydraulic fluid into the chamber via the port causes the ram to drive the piston axially along the piston rod to move the second engagement member toward the first engagement member.

5. The swaging tool of claim 4, and further comprising a spring compressed between a stop on the piston rod and the piston, wherein:

the piston is compressively held between the spring and the ram;

the piston rod is compressively biased to be stationary, with relation to the housing, by the spring; and the spring becomes further compressed by the ram driving the piston axially along the piston rod.

6. The swaging tool of claim 4, wherein the ram is made of a bearing material.

7. A method of axially swaging a ring onto a fitting, comprising:

providing the swaging tool of claim 1;

positioning the ring adjoining a first member selected from the first swaging engagement member and the second swaging engagement member;

positioning the fitting adjoining a second and distinct member selected from the first swaging engagement member and the second swaging engagement member;

actuating the actuator such that the second engagement member moves toward the first engagement member to swage the ring on the fitting.

8. A swaging system for joining a member, the swaging system comprising:

the swaging tool of claim 1;

a fitting having a first sleeve configured for receiving the first member; and a ring configured for axial movement over the sleeve to swage the sleeve to the member;

wherein each swaging engagement member is configured to engage at least one distinct member the group of the fitting and the ring.

9. The swaging system of claim 8, wherein:

the housing defines an axial chamber;

the piston rod extends axially within the housing chamber; and the piston inner guide surface conformingly receives the piston rod such that the piston can translate in opposite axial directions, with respect to the housing, along the piston rod.

10. The swaging system of claim 9, and further comprising a ram having a ram inner guide surface conformingly receiving the piston rod such that the ram can translate in opposite axial directions within the chamber, with respect to the housing, along the piston rod while adjoining the piston.

11. The swaging system of claim 9, and further comprising:

a ram having a ram inner guide surface conformingly receiving the piston rod such that the ram can translate in opposite axial directions, with respect to the housing, along the piston rod while adjoining the piston;

wherein the housing defines a hydraulic port configured for injecting hydraulic fluid into the chamber adjacent the ram; and wherein the housing is configured such that the injection of hydraulic fluid into the chamber via the port causes the ram to drive the piston axially along the piston rod to move the second engagement member toward the first engagement member.

12. The swaging system of claim 11, and further comprising a spring compressed between a stop on the piston rod and the piston, wherein:

the piston is compressively held between the spring and the ram;

the piston rod is compressively biased to be stationary, with relation to the housing, by the spring; and the spring becomes further compressed by the ram driving the piston axially along the piston rod.

13. The swaging system of claim 11, wherein the ram is made of a bearing material.

14. A swaging system for joining a first member to a second member, the swaging system comprising:

the swaging tool of claim 1;

a fitting having a first sleeve configured for receiving the first member and a second sleeve configured for receiving the second member;

a first ring configured for axial movement over the first sleeve to swage the first sleeve to the first member; and a second ring configured for axial movement over the second sleeve to swage the second sleeve to the second member;

wherein the swaging engagement members are configured to engage the fitting and rings.

15. An axial swaging tool for making a tube connection formed by a fitting having a sleeve for receiving a tube and a swaging ring that is moved axially over the sleeve to apply a radial force to the sleeve that swages the sleeve to the tube, the swaging tool comprising:

a housing defining an axial chamber;

an axial piston rod extending axially within the housing chamber;

a piston having a piston inner guide surface defining a through-hole, the inner guide surface conformingly receiving and in sliding engagement with the piston rod such that the piston can translate in opposite axial directions, with respect to the housing, along the piston rod;

a moveable ram adjoining the piston, the ram having a ram inner guide surface defining a bore, the ram inner surface conformingly receiving, and in sliding engagement with, the piston rod such that the ram can translate in opposite axial directions, with respect to the housing, along the piston rod, the ram being made of a bearing material;

a seal on the ram configured to hydraulically seal an axial portion of the housing chamber to form a sealed hydraulic chamber;

a first engagement member statically located on the housing, the first engagement member being configured for axially biasing a first member of a group consisting of the fitting and the swaging ring;

a second engagement member statically located on the piston, the second engagement member being configured for axially biasing a second, distinct member of the group consisting of the fitting and the swaging ring;

a spring, on the piston rod and within the housing chamber, compressed between an axial end of the piston rod and the piston;

wherein the piston rod end is compressively held stationary between the spring and a retainer ring affixed to an axial end of the housing;

wherein the piston is compressively held between the spring and the ram;

wherein the housing defines a hydraulic port configured for injecting hydraulic fluid into the hydraulic chamber;

wherein the housing is configured such that the injection of hydraulic fluid into the hydraulic chamber will cause the ram to drive the piston axially along the piston rod, against the force of the spring, to move the second engagement member toward the first engagement member.

* * * * *